June 16, 1925.  1,542,465
C. D. MACGILL
INDICATOR APPARATUS
Filed Aug. 16, 1921   2 Sheets-Sheet 1
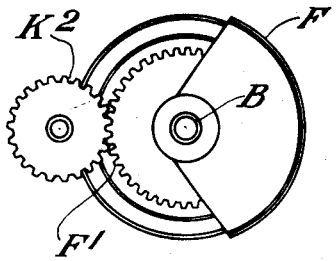
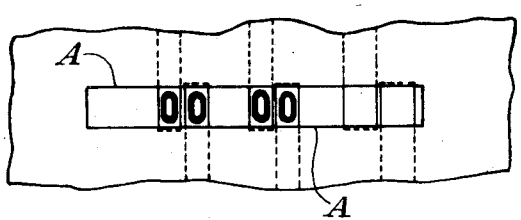
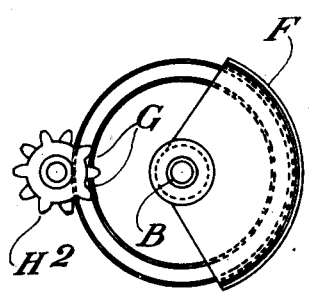
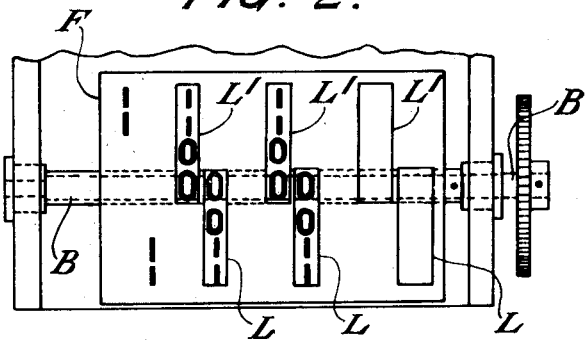
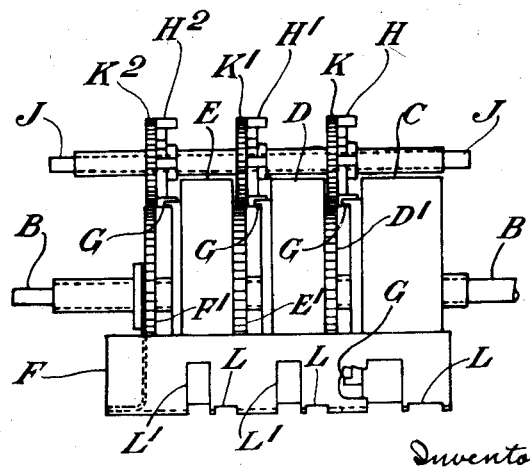
Inventor:
Charles D. Macgill
By J. Walter Fowler
Atty.

June 16, 1925.
C. D. MACGILL
1,542,465
INDICATOR APPARATUS
Filed Aug. 16, 1921   2 Sheets-Sheet 2
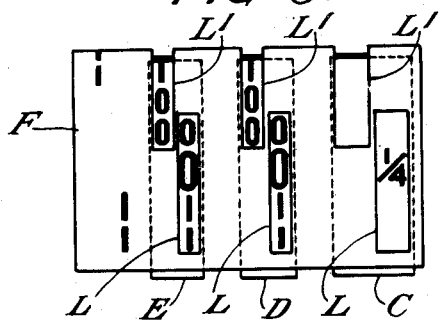
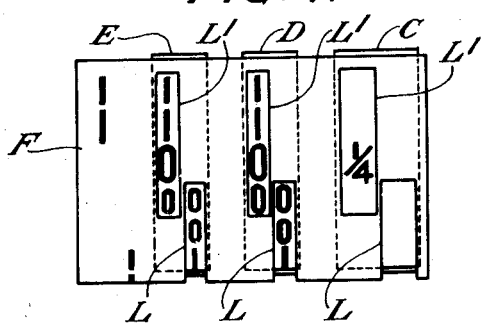
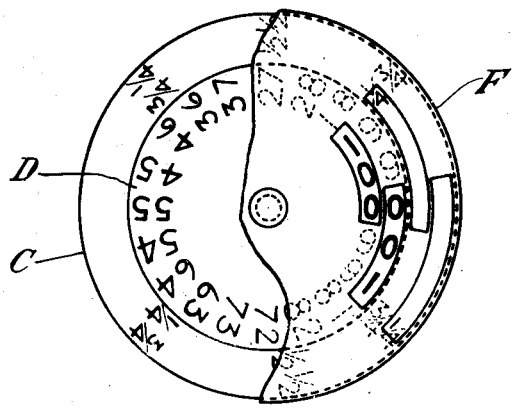

Patented June 16, 1925.

1,542,465

UNITED STATES PATENT OFFICE.

CHARLES DALRYMPLE MACGILL, OF GLASGOW, SCOTLAND, ASSIGNOR TO BARR AND STROUD, LIMITED, OF GLASGOW, SCOTLAND.

INDICATOR APPARATUS.

Application filed August 19, 1921. Serial No. 492,800.

(GRANTED UNDER THE PROVISIONS OF THE ACT OF MARCH 3, 1921, 41 STAT. L., 1313.)

*To all whom it may concern:*

Be it known that I, CHARLES DALRYMPLE MACGILL, a subject of the King of Great Britain and Ireland, and of Caxton Street, Anniesland, Glasgow, Scotland, have invented new and useful Improvements in Indicator Apparatus, for which I have filed application in Great Britain, May 3, 1918, Patent No. 126,436, of which the following is a specification.

This invention relates to indicator apparatus suitable for dealing with indications which extend from what will be termed zero in a positive and negative sense, of the type comprising carry-over gear, such as is used in counting instruments, which operates to carry over indications from one member to another, for instance, for carrying over from a member indicating fractions to one indicating units, or from units to tens. Apparatus of the type in question is, for example, suitable for indicating angles from zero to 180° port and starboard, deflections from zero to, say, 49 knots left and right, or change of range from zero to a maximum "opening" and "closing."

For some purposes it is essential that the passage through zero should be uniform with the passage through any of the other indications, for instance, if the drive applied be considered as imparted step-by-step, each step representing an indication of one degree, a uniform passage through zero is as follows:—2° right, 1° right, 0, 1° left, 2° left.

An example of apparatus in which this method of uniform progression through zero occurs is described in the specification of British Patent No. 29,422 of 1904, granted to Dawson and Buckham. In construction, this apparatus may be considered as comprising two separate indicators geared together, as there is one set of drums for positive indications and another set of drums for negative indications, and provision is made whereby in one position of the parts, the zero indication is exhibited on both sets of drums, and in positive and negative indications one set of the drums is covered and hidden from view while the other set remains exposed.

An example of apparatus in which the zero condition is dealt with by what may be considered to be a single indicator, in that drums are employed forming only one set, each marked with positive and negative indications, is described in the specification of British Patent No. 15256 of 1906, granted to Barr and Stroud, but in this case the method of progression through zero is not uniform, in the sense explained, but is as follows:— 2° right, 1° right, 0 right, 0 left, 1° left, 2° left.

The object of this invention is to produce new or improved apparatus of the single indicator type, comprising carry-over gear, capable of dealing with indications which extend from zero in a positive and negative sense with uniform progression through zero.

Apparatus according to this invention comprises a casing, a window in the casing, hereinafter referred to generally as a longitudinal window, carry-over gear, a driven member (which in some cases may be formed to constitute an indicator member), from which step-by-step motion is imparted by the carry-over gear to an indicator member (or series thereof), a shutter-device (hereinafter referred to for brevity as a shutter) having apertures hereinafter referred to generally as transverse apertures, through which and the longitudinal window strips, hereinafter referred to generally as transverse strips, of the indicator member (or members) may be viewed, the indicator member (or each of the members) having two such transverse strips, associated with carry-over gear, the construction being such that in one position of the parts, a portion of each of the two transverse strips on the indicator member (or on each of the members) is exposed to view in alignment, hereinafter referred to generally as longitudinal through the apertures in the shutter and the longitudinal window, and the carry-over gear is so arranged that when the parts are in that position, it shall operate, by motion imparted to the driven member, to impart to the indicator member (or series thereof) and to the shutter a one step movement simultaneously with the initial movement of the driven member in either a forward or backward sense according to the direction of motion imparted, whereby the shutter operates to hide from view, in the longitudinal alignment aforesaid, the portion of one of the two transverse strips on the indicator member (or each of the members) while leaving a portion of the other transverse strip on the indicator member (or on each of the members) exposed to view.

In construction, the indicator member or members and the shutter may conveniently be mounted to operate about a common axis, for instance, they may be of drum or disc character, but it will be recognized that travelling bands or other equivalents upon which indications are adapted to be placed may be used and actuated in the manner provided for by this invention.

Some examples of construction according to this invention will now be described with reference to the accompanying drawings, in which:—

Figure 1 is an elevation showing portion of an indicator apparatus and longitudinal window through which the indications are seen.

Figure 2 is an elevation of a mechanism with the casing removed showing its parts in the zero indication position.

Figure 3 is a plan showing portions of the mechanism partly in section.

Figure 4 is an end view partly in section and Figure 5 is an end view of parts of the mechanism.

Figures 6 and 7 are elevations, Figure 6 showing parts of the mechanism in the position they assume after the zero indication is passed in one direction and Figure 7 the position they assume in the opposite direction.

Figure 8 is a developed view of the surface of the driven member, which in this case constitutes an indicator drum, and Figure 9 is a developed view of the surface of an indicator drum.

Figure 10 is an elevation showing a modification comprising discs.

In the construction illustrated at Figures 1 to 9, A designates a longitudinal window formed in the face of the casing of the apparatus through which the indications to be exhibited are seen in longitudinal alignment. B is a shaft to which rotary motion is adapted to be imparted in a step-by-step manner. C is a drum of lowest denomination fixed to rotate with the shaft B. D and E are drums of higher denomination and F is a shutter all mounted to turn independently about the shaft B as their axial support. G are carriers each comprising two teeth. The direct driven drum C is provided with two carriers G, G, arranged diametrically, and the drums D and E are provided each with a single carrier G. H, H¹, H² are carry-over sprockets mounted to rotate independently upon a shaft J. K, K¹, K² are pinions fixed respectively to the sprockets H, H¹, H², gearing with toothed wheels D¹, E¹ and F¹, fixed respectively to the drums D, E and shutter F.

With the parts in the position shown at Figures 2, 3 and 4, which is the only position in which the counter shows zero on all drums, one tooth of each carry-over sprocket H¹, H², meshes centrally between the two teeth of its associated carrier G, and one tooth of the sprocket H meshes centrally between two teeth of one of its associated carriers G, so that motion applied to the shaft B, in either direction, will cause the drum C, by direct drive from the shaft B and the drums D, E and shutter F by transmitted drive through the carry-over gear, to be moved one step. The positions assumed by the parts after this first movement has been completed are as shown at Figures 6 and 7, according to the direction of motion applied. Continued motion of the shaft B will then bring the second carrier G of the drum C into operation with its associated carry-over sprocket H, and cause a two step movement to be imparted to the drum D, followed by successive two step movements which will be carried on as they accumulate first to the drum D then to the drum E, and finally to the shutter F, which also may be formed to constitute an indicator member.

With mechanism of this construction the direct driven drum C may be marked with fractional indications as shown developed at Figure 8, the drum D with "unit" indications, the drum E with "tens" indications, each as shown developed at Figure 9 and the shutter F with "hundred" indications, see Figure 2. The shutter is also formed with transverse apertures, one for each transverse strip of indications marked on the drums C, D and E. These transverse apertures are arranged to form two groups, one group L through which positive indications will be seen, and another group L¹ through which negative indications will be seen, and through both groups zero indications will be seen. In arrangement, the apertures of the group L extend from an edge coincident, or approximately so, with the upper edge of the window A and extend across the window downwardly therefrom, those of group L¹ extend from an edge coincident with the lower edge of the window A and extend across the window upwardly therefrom.

With these markings the mechanism in operation for positive values will exhibit at the window A indications as follows:—

| Movement. | Shutter. | Drum E. | | Drum D. | | Drum C. |
|---|---|---|---|---|---|---|
|  | Blank | 0 | 0 | 0 | 0 | Blank |
| 1st | Blank | 0 |  | 0 |  | ¼ |
| 2nd | Blank | 0 |  | 0 |  | ½ |
| 3rd | Blank | 0 |  | 0 |  | ¾ |
| 4th | Blank | 0 |  | 1 |  | Blank |
| 5th | Blank | 0 |  | 1 |  | ¼ |
| 6th | Blank | 0 |  | 1 |  | ½ |
| 7th | Blank | 0 |  | 1 |  | ¾ |
| 8th | Blank | 0 |  | 2 |  | Blank |
| 9th | Blank | 0 |  | 2 |  | ¼ |
| and so on up to | 1 | 9 |  | 9 |  | ¾ |

For negative values from the zero position the indications will be as follows:—

| Movement. | Shutter. | Drum E. | | Drum D. | | Drum C. |
|---|---|---|---|---|---|---|
|  | Blank | 0 | 0 | 0 | 0 | Blank |
| 1st | Blank | 0 |  | 0 |  | ¼ |
| 2nd | Blank | 0 |  | 0 |  | ½ |
| 3rd | Blank | 0 |  | 0 |  | ¾ |
| 4th | Blank | 0 |  | 1 |  | Blank |
| and so on up to | 1 | 9 |  | 9 |  | ¾ |

For distinguishing the positive from the negative indications, markings of different colour or character may be adopted.

Thus it will be recognized that in the zero position the shutter exhibits a blank, the drum E exhibits 0 0, the drum D, exhibits 0 0, and the drum C exhibits a blank. The first movement for either positive or negative indications causes motion to be imparted to the drum C, by direct drive corresponding to a ¼ indication, and motion to be imparted to the drum D, the drum E and shutter F, by transmitted drive through the carry-over gear corresponding to one step. This one step movement of the shutter taking the case for positive indications as shown at Figure 6, causes the group of apertures L¹ to be removed from the window A and new portions of the group of apertures L to be brought beneath the window, simultaneously the second 0 on the drum E, the second 0 on the drum D, and the ¼ indication on the drum C are brought into position beneath the window. The second and third movements only affect drum C as it passes through indications ½ and ¾. The fourth movement affects drum C and drum D, drum C passes to a blank indication and a first stem motion in transmitted by the second carrier G on the drum C to the carry-over sprocket H which operates and brings into view the first 1 on the drum D. The fifth movement again affects drum C and drum D, drum C passes to a ¼ indication and a second step motion is transmitted by the same carrier G to the carry-over sprocket H which brings into view the second 1 on the drum D. The function of the two similar indications provided in succession in each strip on the drums D, E will thus be understood.

It will be recognized that constructions according to this invention are not restricted to mechanism in which the driven member, such as the drum C, is provided with two carriers G, G, each comprising two teeth, as only one or more than two such carriers may be provided. With mechanism of the character described and the drive suitably modified, if one carrier G only was provided and ¼ indications adopted on drum C, the circumferential markings would embrace the value of one unit, whereas if three carriers situated at equal intervals apart were provided the circumferential markings would embrace the value of three units. In the same manner the members, such as the drums D and E, may be provided with more than one carrier G, which with mechanism of the character described and gear suitably modified would, say, in the case of two carriers arranged diametrically being provided on the drum D, necessitate markings indicating units embracing the value of two tens.

In the example illustrated at Figure 10, C designates a direct driven disc, which is formed to constitute an indicator disc, D an indicator and F a shutter, each of disc form. In this view carry-over gear by which motion is transmitted to D and F is not shown, and it is thought that the operation of the mechanism in this form will be understood without further explanation.

I claim:—

1. Indicator apparatus comprising a casing, a longitudinal window in the casing, carry-over gear, a driven member from which step-by-step motion is imparted by the carry-over gear to an indicator member, a shutter having transverse apertures through which and the window transverse strips of the indicator member may be viewed, the indicator member having two such transverse strips, so constructed and arranged that in one position of the parts a portion of each of the two transverse strips on the indicator member is exposed to view in longitudinal alignment through the transverse apertures in the shutter, and the carry-over gear so arranged that when the parts are in that position it shall operate, by motion imparted to the driven member, to impart to the indicator member and to the shutter a one step movement simultaneously with the initial movement of the driven member in either a forward or backward sense according to the direction of motion imparted, whereby the shutter operates to hide from view, in the longitudinal alignment aforesaid, the portion of one of the two transverse strips on the indicator member while leaving a portion of the other transverse strip on the indicator member exposed to view, markings on each transverse strip of the indicator member comprising two similar indications in succession in each transverse strip, for the purposes set forth.

2. Indicator apparatus comprising a casing, a longitudinal window in the casing, a direct driven member, a gear driven member, a shutter, two groups of transverse apertures in the shutter, carry-over gear for operating the gear driven member and the shutter, two transverse strips of numeral markings on the surface of the gear driven member, each of the markings consisting of numerals arranged consecutively in duplicate pairs, for the purposes set forth.

CHARLES DALRYMPLE MACGILL.